MAGENTIC RECORDING AND REPRODUCING SYSTEM

Filed Sept. 24, 1963

7 Sheets-Sheet 1

INVENTOR.
Jerome H. Lemelson

INVENTOR.
Jerome H. Lemelson

INVENTOR.
JEROME H. LEMELSON

INVENTOR.
JEROME H. LEMELSON

MAGENTIC RECORDING AND REPRODUCING SYSTEM

Filed Sept. 24, 1963 7 Sheets-Sheet 5

INVENTOR.
Jerome H. Lemelson

INVENTOR.
JEROME H. LEMELSON

May 12, 1970 J. H. LEMELSON 3,511,940

MAGENTIC RECORDING AND REPRODUCING SYSTEM

Filed Sept. 24, 1963 7 Sheets-Sheet 7

INVENTOR.
Jerome H. Lemelson

United States Patent Office 3,511,940
Patented May 12, 1970

3,511,940
MAGNETIC RECORDING AND REPRODUCING SYSTEM

Jerome H. Lemelson, 85 Rector St., Metuchen, N.J. 08840

Continuation-in-part of applications Ser. No. 685,692, Sept. 23, 1957, and Ser. No. 142,748, Aug. 28, 1961, the latter being a division of application Ser. No. 515,417, June 14, 1955. This application Sept. 24, 1963, Ser. No. 311,252
Int. Cl. G11l 21/12, 23/06, 23/18
U.S. Cl. 179—100.2 12 Claims

ABSTRACT OF THE DISCLOSURE

Multiple-channel magnetic recording and reproduction apparatus is provided for the transcribing of signals relative to selected channels thereof. In one form, plural magnetic tapes are wound in endless loops and are provided in respective magazines, which magazines are placed side by side to form a deck. A common drive means is operated to drive all the tapes for effecting selective recording or playback functions. Other forms of the invention relate to means for controlling the tape drive and effecting the selective recording and reproduction of signals relative to selected recording tapes.

This invention relates to magnetic recording and reproduction apparatus and is a continuation-in-part of a first application Ser. No. 685,692, entitled, Magnetic Recording System, filed Sept. 23, 1957, now U.S. Pat No. 3,106,612, and a second application Ser. No. 142,748 entitled, Computing Apparatus, filed Aug. 28, 1961, the latter being a division of application Ser. No. 515,417, filed on June 14, 1955, now Pat. No. 3,003,109.

An object of this invention is to provide an improved magnetic recording apparatus for selectively recording and playing back magnetic signal recordings such as recordings of musical compositions, messages or the like.

Another object is to provide an improved magnetic recording and reproduction apparatus having novel and simple means for selectively recording on and reproducing from one or more of a plurality of recording channels of one or more magnetic recording members.

Other objects and advantages of the invention will be apparent from the following description reference being made to the accompanying drawings wherein.

Figures 1, 2:
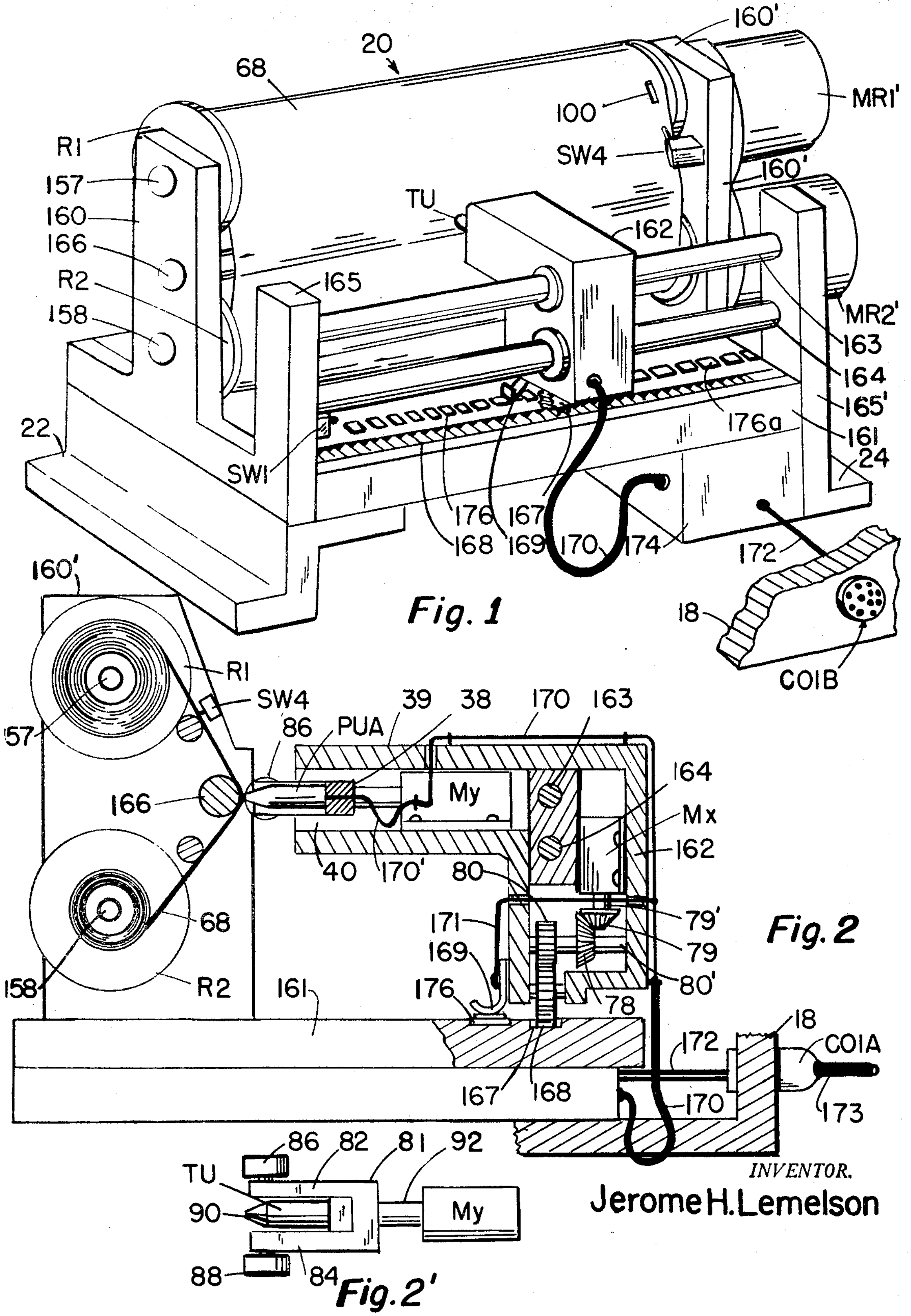
FIG. 1 is an isometric view of a magnetic recording and reproduction device which may be utilized as a component of the invention.
FIG. 2 is a section taken on broken line 2—2 of FIG. 1 showing further details of the unit of FIG. 1.

FIG. 2' is a plan view of a modified transducer head and mount which is applicable to the apparatus of FIGS. 1 and 2.

Figure 3:
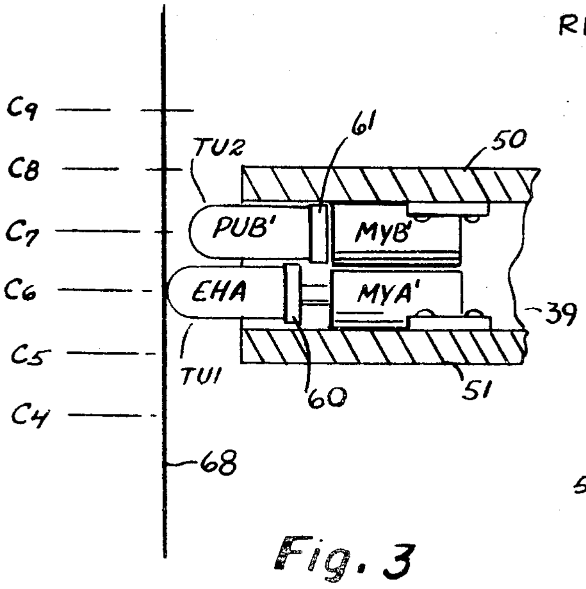

FIG. 3 is a partly sectioned plan view of magnetic transducing means applicable to the device of FIGS. 1 and 2.

Figure 4:
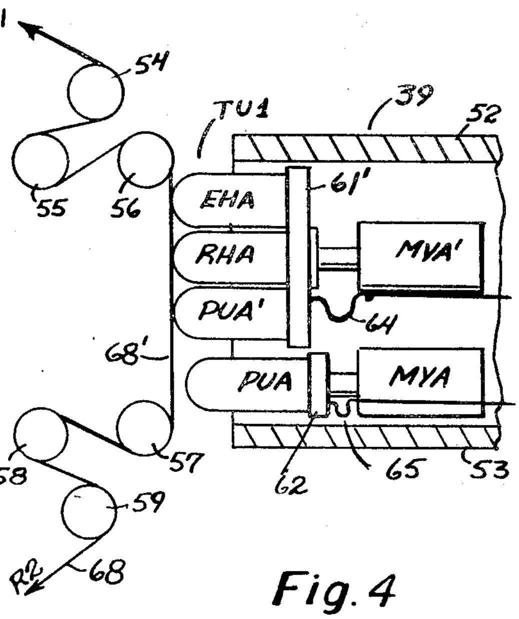

FIG. 4 and FIG. 4' are partly sectioned side views of the apparatus of FIG. 3.

Figure 5:
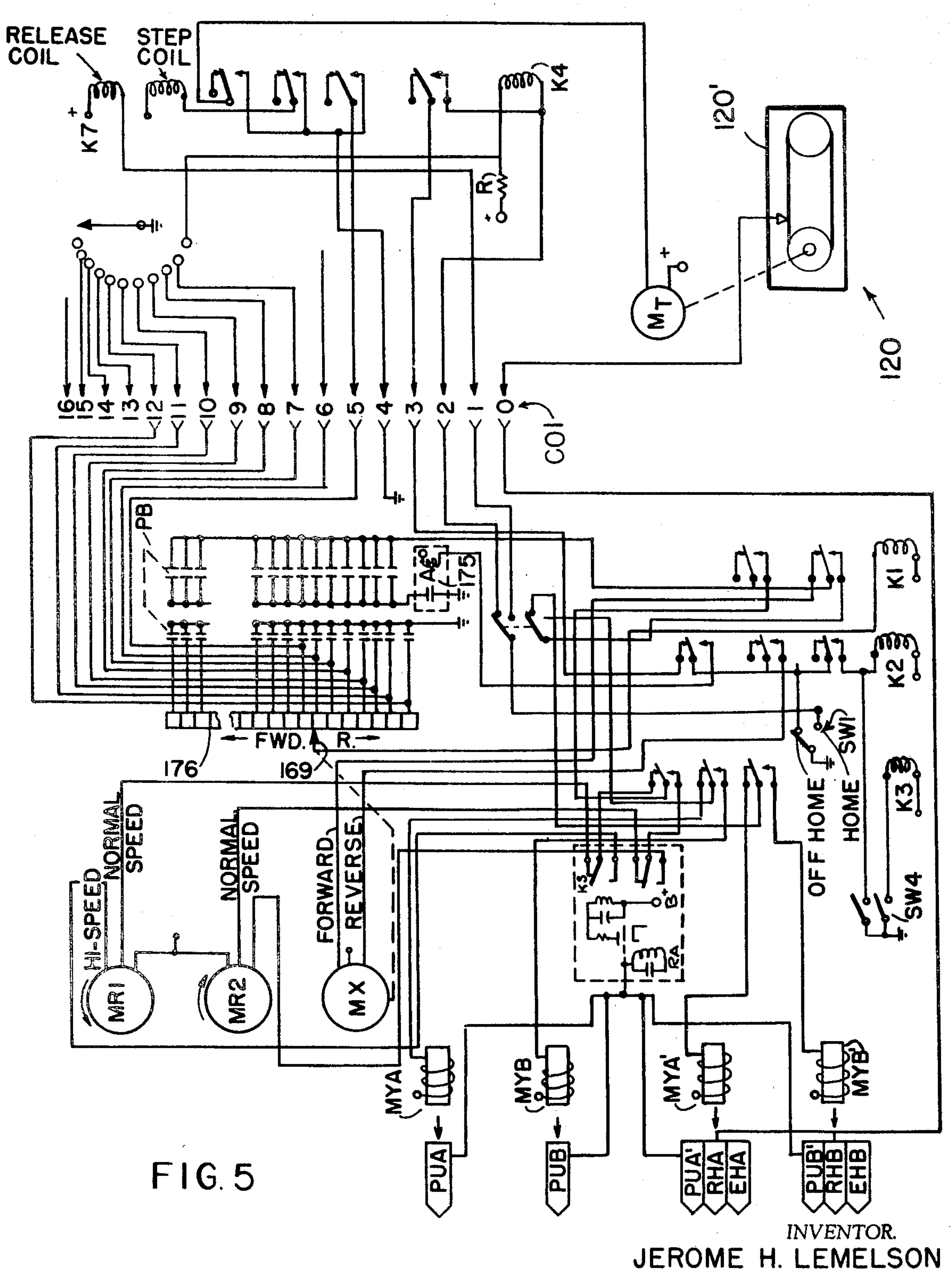

FIG. 5 shows schematically a typical electrical circuit for controlling the apparatus of FIGS. 1 to 4.

Figure 6:
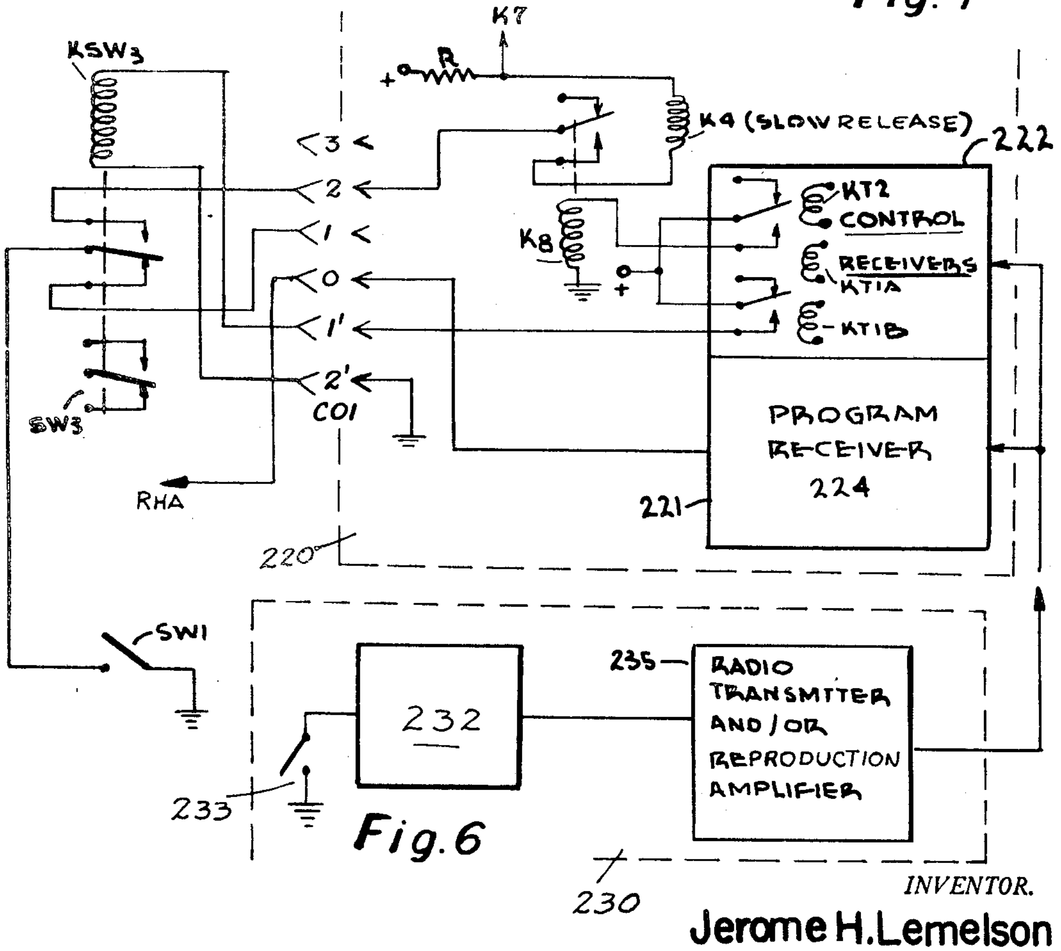

FIG. 6 shows schematically modified control means for the circuit of FIG. 3 permitting remote conditioning of the recording medium of the apparatus of FIGS. 1 and 2 and controlled transcription thereon from a remote location.

Figures 4, 7:
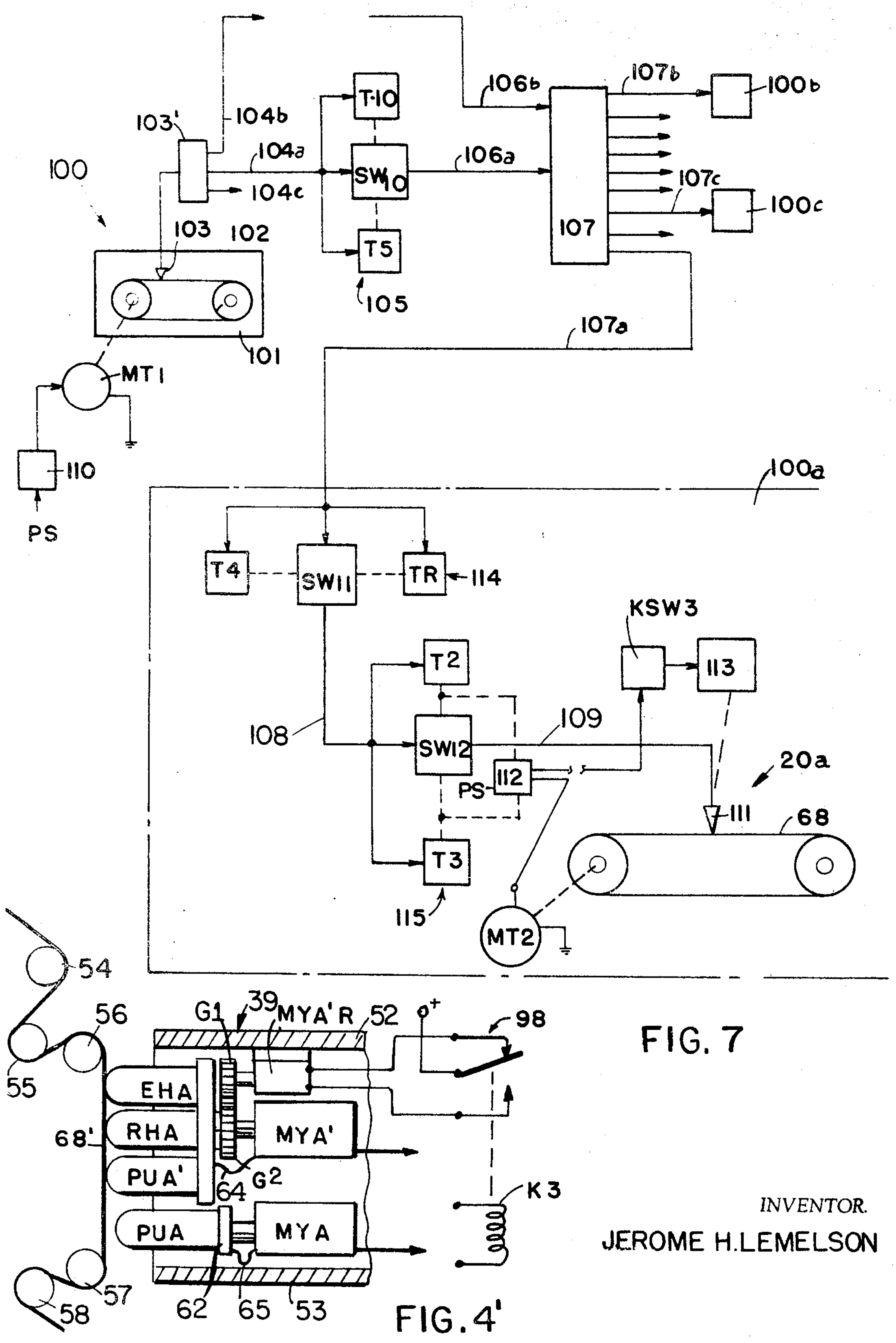

FIG. 7 is a block diagram showing further details of FIG. 6 and of apparatus for automatically communicating between recording and reproduction apparatus in general.

Figures 8, 9:
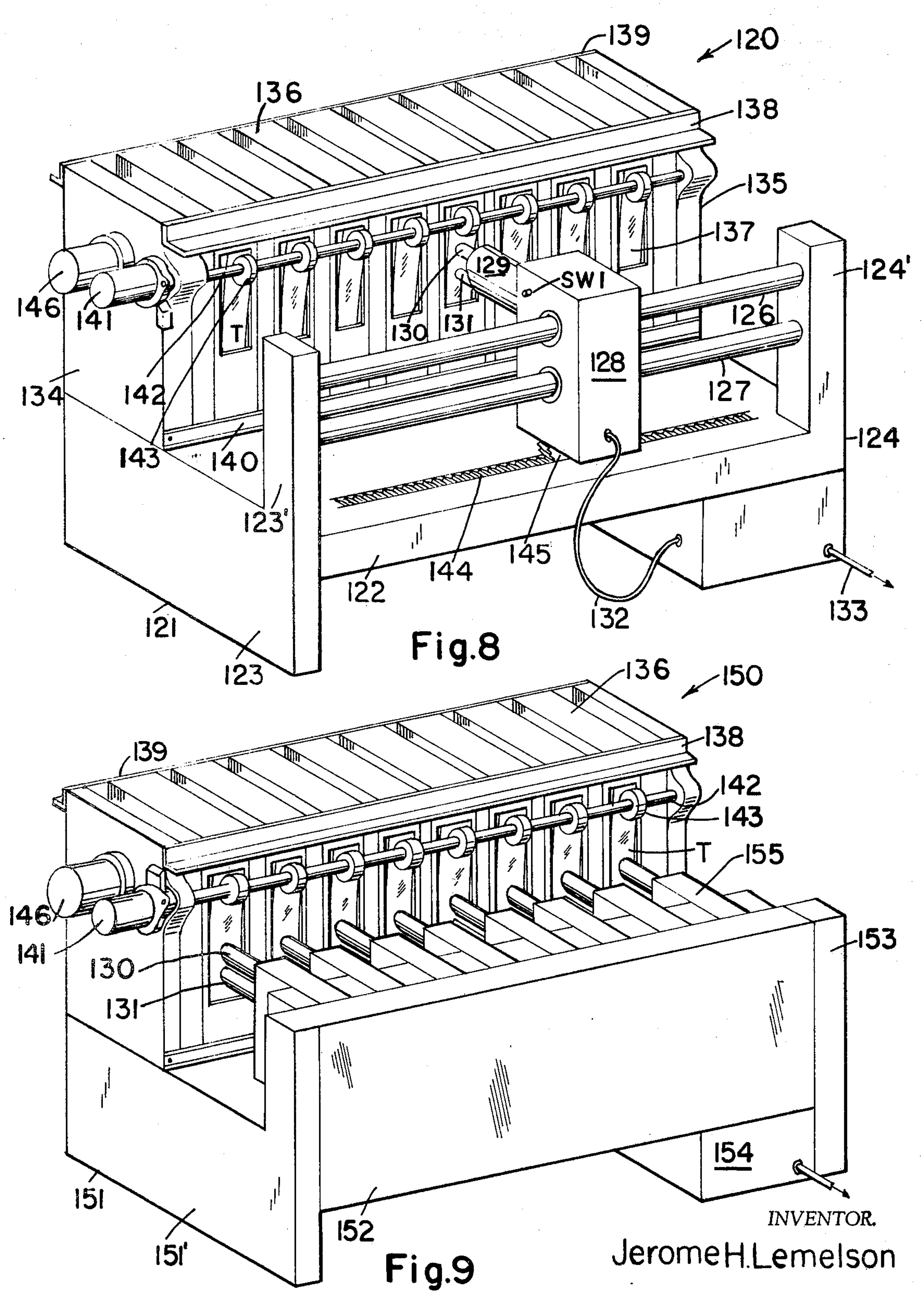
Figures 10, 11, 12, 13, 14, 15:
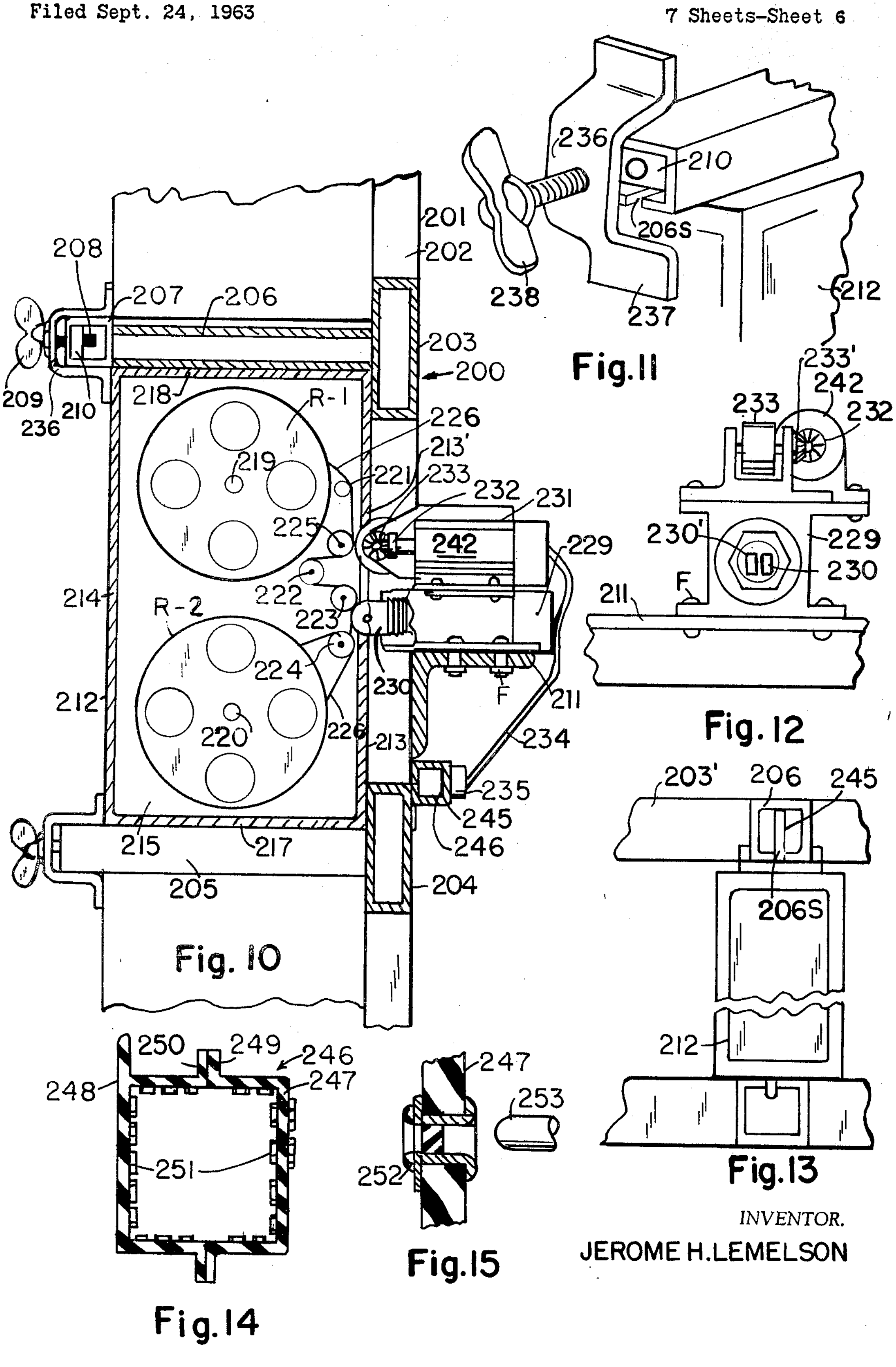
Figures 16, 17:
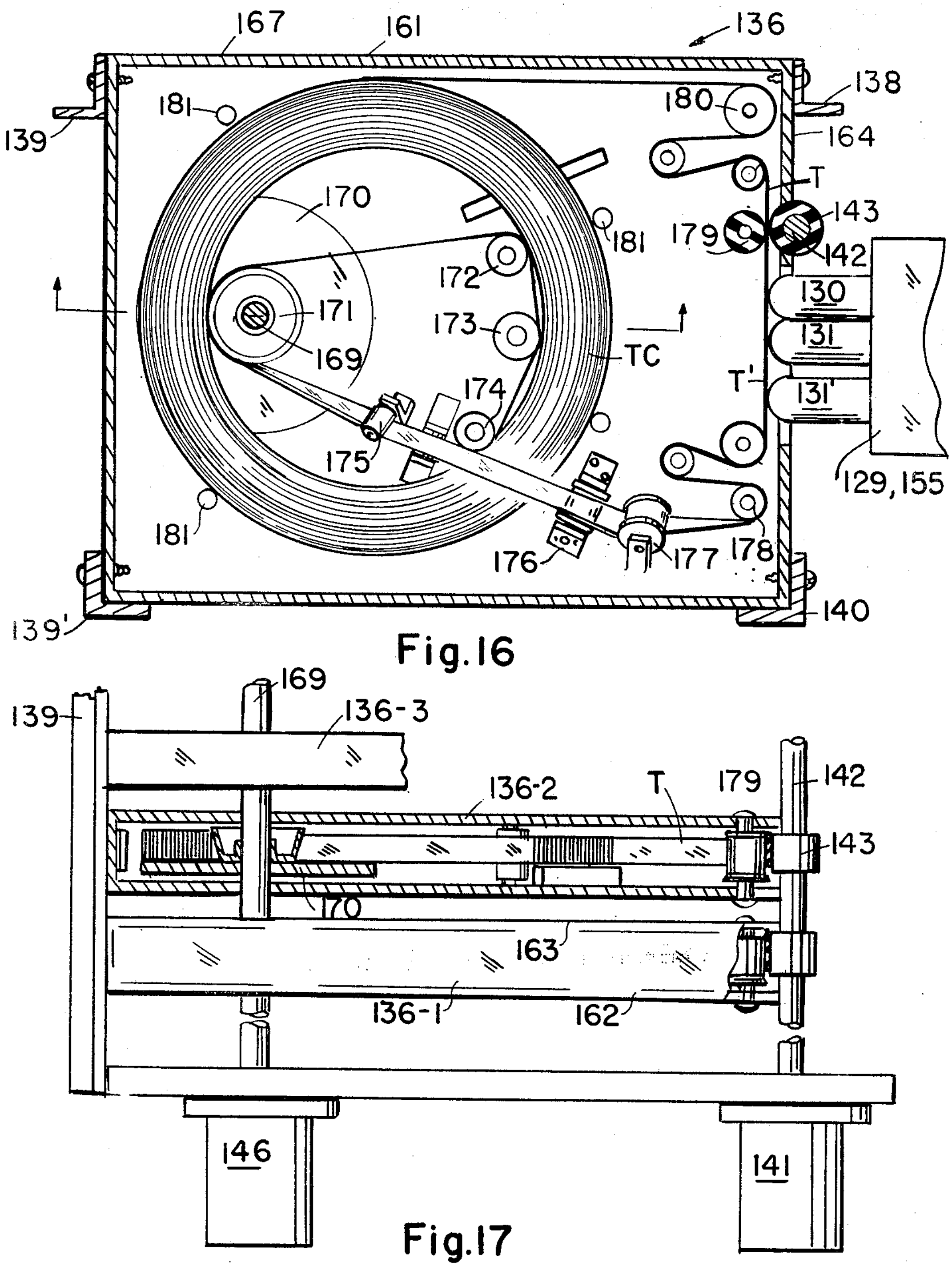

FIG. 8 is an isometric view of a recording and reproduction device employing a movable carriage and a plurality of tape containing magazines or cartridges;

FIG. 9 is an isometric view of a recording and reproduction device applicable to this invention employing a plurality of transducers which are mounted fixed relative to a plurality of replaceable magazines, each magazine having one or more transducers in operative relation therewith for recording and/or reproduction purposes;

FIG. 10 is a partial side view with parts broken away for clarity of a magnetic tape magazine and racking therefore;

FIG. 11 is an isometric view of a fragment of a magnetic tape magazine showing means for releasibly supporting said magazine relative to the racking of FIG. 10;

FIG. 12 is a fragmentary view of a portion of the apparatus of FIG. 10;

FIG. 13 is a partial view of a modified form of the racking arrangement of FIG. 10;

FIG. 14 is a cross-sectional view of a structural member applicable to the apparatus of FIG. 10;

FIG. 15 is a cross-sectional view of a portion of the wall of the component of FIG. 14;

FIG. 16 is a side view with parts broken away for clarity of a magnetic tape magazine of the type illustrated in FIGS. 8–10; and FIG. 17 is a partial plan view with parts broken away for clarity of a plurality of magazines of the type illustrated in FIG. 16 arranged as in FIGS. 8 and 9.

In FIG. 1 there is shown a compact magnetic recording and reproduction unit 20 having means for recording on and reproducing from a selected recording track of a plurality of recording tracks provided on a relatively wide flexible magnetic recording tape or band 68 which is driven from one of two reels R–1 and R–2 to the other. The reels are provided with axles or shafts 157 and 158 which are rotationally supported by bearing means secured to end uprights 160 and 160' extending from a rigid platen or base 161. The base 161 is supported on brackets 22 and 24 which are secured to a chassis or the shelf of a juke box housing 18 partly shown. The platen 161 also supports a pair of uprights 165 and 166 which support a pair of parallel cylindrical rod 163 and 164 which serve as a track for guiding a carriage 162 mounting a transducing unit TU having magnetic recording and reproduction heads which are projectable from retracted positions on said carriage 162 to engage or be positioned a short distance off said tape 68 for transducing thereto or therefrom. The carriage 162 is driven by a reversible electric motor MX mounted thereon, and shown in the partly sectioned view of FIG. 2, to travel parallel to the surface of the tape 68. A gear or toothed wheel 167, rotated by motor MX through a gear train comprising gears 78, 79, 80 and 81 is supported in bearing by the sidewalls of the housing 162 and is adapted to engage the teeth of a flat spur gear 168 which is cut in or provided on the platen 161 and extends parallel to the carriage track a sufficient distance to permit the desired travel of 162 under the power of motor MX. The numerals 79' and 80' refer to shafts for the gears 79 and 80 supported in bearing by the walls of the carriage housing. The carriage 162 is provided with a projecting section 39 having an open bore 40 in which is movably mounted one or more transducing units on a base 38 in addition to other recording and reproduction transducers to be described.

The unit 38 is driven from a retracted position in the bore 40 to the projected position shown in FIG. 2 whereby the transducing head is touching or positioned less than a thousandth of an inch off the tape 68, by a lineal motor solenoid MY secured in 39. Said solenoid is a bistable push-pull device which projects the head mount 38 against the tape 68 or closely adjacent thereto when energized.

A flexible harness 170' of electrical cable extends from transducer housing 38 and is provided with sufficient slack to permit motion of 38 from said retracted to said extended position. The harness 170' contains conductors for signal input to and output from the magnetic transducer heads provided in TU. The cable or harness 170 extends from the carriage 162 to a housing 174 under the base 161 which contains input connection means CO–1B and/or amplifying and control circuit components. Sufficient slack is provided in the cable 170 to permit motion of the carriage along its track between uprights 165 and 165'. Notation 176 refers to a selection track of multiple short length conducting strip contactors **176*a* secured adjacent track 168 which extend as a train and are insulatedly mounted apart and off base plate 161. The individual contactor elements 176*a* are adapted to be swept by an electrical brush or sensor 169 which is insulatedly mounted on housing 162. Wires (not shown) extend from each surface conductor 176*a* to a rotary selection switch K7 (illustrated in FIG. 5) for selection of a predetermined channel on tape 68 for transducing from or to by positional control of the carriage 162 when a circuit is grounded as the sensor 169 sweeps over the surface elements 176. The numeral 171 refers to an insulated conductor extending from sensor 169 to the harness cable 170 which it joins and extends therein to the externally mounted control circuitry in or beyond housing 18**.

Drive units $MR_1'$ and $MR_2'$ containing motors MR–1 and MR–2 and the necessary gearing and motor speed controls are shown mounted on the upright 160' with the shafts of the drive motors therein coupled to shafts 157 and 158 for rotating either drum R–1 or R–2 to wind-up the tape 168 from the other in motion past the transducing unit or heads. A first means for positioning the tape 68 relative the transducing head PU comprises a cylindrical rod 166 extending between and supported by uprights 160 and 160' over which said tape 68 is driven. Since rod 166 is fixed relative to the track for guiding carriage 162, if tape 68 is maintained in surface contact with 166 the recording surface thereof will be fixed relative to the transducing head PU when in either of its bistable positions and the latter may be adjustable positioned to just touch or be a short predetermined distance off 68 when projected by MY.

If the thickness of tape 68 is precisely maintained along its length and it is drawn taut without stretching against rod 166 during its forward or reverse motion by the provision of conventional tape tensioning means in the drive means for said belt 68, and if the guides and bearings for carriage 162 are precisely made and mounted such that the transducing head or heads of unit TU remain a fixed distance away from said tape where it is drawn against rod 166, then said transducer(s) may be rigidly affixed to 39 such that the tip of each transducer is positioned the required short distance off 68 for transducing (usually less than .001 inch) during the movement of carriage 162 along its entire length of travel. As a result, the servo MY for advancing the transducer against or close to the tape 68 would be eliminated and the control means to be described would be simplified by the elimination of the transducer projecting servos MY and movable mount therefor.

If rod 166 is made of a fluorocarbon resin or is coated therewith, friction on the rear surface of tape 68 will be minimized.

FIG. 2' is a plan view of a modified transducing head mounting for precisely positioning said head end a fixed distance off tape 68 for transducing thereto and/or therefrom. The transducer head TU is mounted on the base of a yoke 81 and extends between the arms 82 and 84 of said yoke, as shown, whereby the nose 90 of the transducer (containing the conventional magnetization gap or gaps) projects from the end of said yoke. Small wheels 86 and 88 are rotationally mounted on the arms 82 and 84 and are adapted to engage the tape 68 against 166 when MY projects assembly 80 mounted on shaft 92. The wheels, abutting the tape and backing rod or roller 166 thus preposition 90 relative to tape 68. If the transducer head is mounted so that its nose 90 is positioned said brief distance (½ mil or so) of the surface of tape 68 when the latter is drawn over 166 and when the solenoid MY is fully projected and the free play in the bearings for the wheels 86 and 88 is fully taken up as they bear against said tape backed up by 166 as in FIG. 2, then the tape 68 will be contacted only by the rolling wheels and will not be worn or scratched by the action of said stationary head 90 bearing thereagainst.

FIGS. 3 and 4 show variations in the tape guidance and magnetic transducing means of FIGS. 1 and 2 for permitting automatic transcribing functions to be performed on the recording medium of said magnetic recording apparatus or similar apparatus.

In the modified transducing head design of FIGS. 3 and 4, eight transducing heads are movably mounted in the housing 39 and are projectable therefrom by four solenoids which are secured to the side walls 50 and 51 of housing 39. Positioned adjacent the top 52 of housing 39 are two groups of three magnetic heads each referred to by the notations TU1 and TU2. The heads of group TU1 are in vertical alignment on a common base mount 61 and are simultaneously projected by a solenoid MYA'. Said heads comprise an erase head EHA, a recording head RHA and a reproduction head PUA' and are utilized for providing new recordings on selected even channels C–2, C–4, C–6, C–8, etc., of the tape 68 shown in the plan view of FIG. 3 as extending between odd channels C–1, C–3, C–5, C–7, etc. Said odd channels are adapted to be driven past and be transduced on by the magnetic heads of the transducer unit TU1. Each particular recording is thus provided in one direction on an odd channel and in the reverse direction on an adjacent even channel so that regardless of which end the tape had been previously driven, playback of the same recording or of any of the other recordings, which are selectively transduced therefrom, may be derived without rewinding said magnetic belt. The heads of unit TU2 are thus provided in the reverse order of those of the unit TU1. As the tape moves from reel R–1 to R–2 when the apparatus is controlled to effect transcription of a new recording on an even channel thereof, the erase head EHA is energized to erase the prior recording and noise therefrom, the recording head RHA transcribes the new signal on the erased channel and the third head PUA' reproduces the newly recorded signal for monitoring purposes.

Two reproduction heads PUA and PUB (only one of which, PUA, is illustrated in FIG. 4, the other being positioned behind PUA in said view) are respectively controlled to engage and retract from a free stretch 68' of belt 68 by separate solenoids MYA and MYB secured to sidewalls 50 and 51. Whereas the heads PUA' and PUB' may be utilized for selective playback as well as monitoring purposes, the auxiliary units PUA and PUB are provided to reduce the degree of wear on the surface of 68 caused when the three heads contact said tape. Notations 64 and 65 refer to flexible conducting cable provided with sufficient slack length to electrically connect the movable heads of units TU and heads PU with the housing 39 wherefrom they extend through harness 170 to control apparatus situated remotely therefrom which will be described.

The magnetic belt guiding means of FIGS. 1 and 2 has been modified in FIGS. 3 and 4 to provide a free stretch 68' of tape against which said heads may bear during reproduction as well as transcription functions. The free wheeling rollers 54 to 59 are supported in bearing by the uprights 160 and 160' of the device 20 of FIG. 1 and provide means for guiding said flexible magnetic recording member 68 in the path illustrated.

It is noted that one of said rollers 54 to 59 may coact with a drive roll for direct drive of 68 by conventional depressor-drive wheel means which includes frictional engagement of 68 between a powered roll and one of the rolls 54 to 59.

The device of FIGS. 1 and 2, or any similar multichannel magnetic recording device such as an array of narrower magnetic tapes or wires provided with a common drive means and providing multiple side by side recording channels in the manner of the wide belt or band 68, may be utilized as part of a compact juke box record playback device with the recordings or music record signals thereof capable of being changed or rejuvenated by automatic means either locally or from a remote transmission station. This will eliminate the need to replace recording units such as discs or reels of tape with a resulting labor and monetary saving in performing these operations and will save considerable time in effecting said record changing.

For effecting transcribing functions in the unit 20, a cable 172 is connected to multiple terminals in a female connector CO–1B shown in FIG. 1 as being secured to a wall 18 of the juke box housing, which carries the multiple conducting wires therein to the housing 174 in which is located the various control and switching elements for controlling playback and recording functions to be described. A male plug or multipin connector CO–1A is shown in FIG. 2 coupled with CO–1B and extends multiple wires via cable 173 to respective circuit elements in 20 connecting thereto; control elements of an automatic transcribing unit to be described.

FIG. 4′ shows a modified transducing unit for recording on and reproducing from the tape 68′, which unlike the design of FIGS. 3 and 4, employs only a single bank of heads EHA (erase), RHA (record) and PUA′ (reproduce during transcribing), and PUA (normal playback) the latter being projectable by a single solenoid and the former three performing the functions of the dual assemblies TU1 and TU2 of FIGS. 3 and 4. In order to provide the bank of three heads, which are mounted on a modified mount 61′, in the reverse order when so needed during transcribing, said mount 61′ is rotationally mounted on the shaft of the projection solenoid MYA′ and is rotated through 180 degrees by a bistable rotary solenoid MYA′R secured to 39 and driving 61′ in rotary motion through gears G–1 and G–2 or via a crank means. Since MYA′R is a bistable servo, each of its actuating inputs is shown connected to a bistable switch 98 which is part of the bank of switches actuated by the relay K3. Hence, every time K3 is energized which occurs at the end of each travel of the tape, the heads TU1′ of FIG. 4′ will rotate 180 degrees so that they are in the proper order for transcribing.

The following identification of parts is presented to simplify the description of the control means illustrated in FIG. 5 and 6 for controlling the apparatus of FIGS. 1 to 4 in automatic recording and monitoring and reproduction functions:

MX—Reversible motor for driving carriage 162
176—Selection track along side of track 168
MXS—Selection sensor driven by MX along 176 (brush 169 FIG. 2)
MR1—Motor for driving tape drum for odd channels
MR2—Motor for driving tape drum for even channels
PUA—Playback head for odd channels
PUB—Playback head for even channels
PUA′—Playback head for playback during transcribing on odd channels
PUB′—Playback head for playback during transcribing on even channels
RHA—Record head for transcribing on odd channels
EHA—Erase head for transcribing on odd channels
RHB—Record head for transcribing on even channels
EHB—Erase head for transcribing on even channels
MYA—Solenoid for actuation of PUA
MYB—Solenoid for actuation of PUB
MYA′—Solenoid for actuation of PUB′, RHB, EHB
C—Coupling capacitors RA—Reproduction amplifier which has in addition to normal voice amplification stage an additional stage with a slow operate relay for "end-tone" transfer to high speed playout
PB—Pushbutton record selectors (part of 175)—two normally open contacts for each pushbutton, arranged so that only one may be depressed at a time.
K1—Start relay—general purpose telephone type
K2—Stop relay—general purpose telephone type
K3—Odd-even transfer relay—bistable, stepping type
K4—Transcribe relay—slow release telephone type
K5—"End-tone" recognition relay—sensitive plate relay type—causes high speed play out
K6—Electromagnetic device to release coin and open coin operated closure A
K7—Augo channel selector switch—minor switch
A—Coin operated closure for start of playback
R—Resistor for power supply protection at end of transcribing
Co1—Connector for attachment of transcribing unit, multipin type
Sw1—Carriage home switch (normally open monostable limit switch) actuated by movement of carriage against upright 165
Sw3—Transfer toggle switch to initiate automatic transcribing
Sw4—End of record time-allowance switch—closes after a period of time from start of record equal to the time allowed for the longest recording when actuator arm falls into slot 100 in recording belt 68
MT—Transcriber motor—operates at same speed as $M_{R1}$ and $M_{R2}$ bi-speed, drives record medium of transcriber playback unit 120.
KSW3—Tone operative relay replacement for SW3 for remote transcribing
K8—"Begin-new-transcription" relay for remote transcribing
221—Control and program receiver for remote transcribing
SW5—Manually operated "omit-transcribing" switches
K9—"Step-to-next-channel" relay for local selective transcribing (2 pole switches to step over 2 channels at a time for odd and even)
L15—Coin slot mechanism including closure switch "A" for start of selected playback
120—Transcriber unit for local transcribing record signals on recording medium of recording unit 20
220—Local transcriber unit attachment to recording unit 20 for remote transcribing.
230—Remote transcriber unit for remote transcribing consisting of a record signal reproducer or generator 232 and a transmitter or amplifier 234

The system shown in FIG. 5 provides for the selective playback of a recording or record signal from one of a multiple of recording channels on a belt such as belt 68 of FIGS. 1 to 4 or from one of a multiple of aligned narrow tapes of equal length driven off a common shaft or shafts. The system is shown for the specific case of a coin operated "record" player having two recordings of each record on adjacent channels each to be played back from or reproduced by the belt travelling past either of two playback heads in either the forward or reverse direction which in the unit 20 of FIGS. 1 and 2 is shown as either the up or down directions.

Also shown in FIG. 5 is part of an automatic transcribing unit which can be connected to said playback unit 20 for unattended transcribing of new recordings onto the magnetic recording belt 68.

OPERATION OF PLAYBACK UNIT

Consider the switch SW3 down for normal playback and the carrige 162 in the "home" position; therefore SW1 down and $MX_S$ home. Also, assume $K_3$ as having been left in the position shown. Selection of a recording is made by depressing a push-button of the bank of selection switches PB and depositing a coin in the coin slot or receptacle. The coin causes a closure of "A" which provides a ground through contacts on K1 for the "forward" winding on $M_X$. This causes MX to operate moving the carriage 162 along track 168 and moving $MX_S$ along the line of contactors 176 until it reaches the insulated segment to which the pushbutton switch selected is attached. Depressing the push-button switch had connected the track segment to ground. When $MX_S$ reaches this segment it connects this ground to $K_1$ operating it and causing the ground through "A" to be disconnected from MX thus stopping MX and causing the ground to be applied through $SW_3$ to solenoid MYA causing the reproduction head PUA to be projected forward against the selected belt recording channel. When K1 operates, the ground through "A" is also applied to MR1 causing the belt drum to start revolving carrying the belt past reproducing head PUA.

The recording is picked up by PUA and amplified by the reproduction amplifier RA. An additional stage is added to RA which is frequency selective and has a slow operating relay in its plate circuit. To signify the end of a record playback cycle, a low level pulse of a single frequency tone to which the last stage of RA is responsive is transcribed on the magnetic belt after the end of the recording of the record signal or musical piece, for a duration of approximately one second. Upon receipt of this pulse, K5 operates and switches the tape driving motor (either MR1 or MR2 depending on which is in operation at the time) from normal to high speed to reach the end of the belt travel which is determined by the length of the longest recording. This is done to reduce the downtime between playback cycles which are selected to occur one after the other. When the belt is so run out, limit switch SW4 becomes energized as its arm or actuator rides in said cutout 100 in the tape 68 and causes K2 and K3 to operate. Operation of K2 applies a ground through SW1 which is now up, to the "reverse" winding of MX causing the carriage to return to home. Simultaneously, operation of K2 causes K2 to lock-in through the ground afforded by SW1 although K5 may have deenergized and causes operation of K6 allowing the coin to drop and contact "A" to open. When the carriage returns to home, SW1 is again held down and K2 unlatched.

Operation of K3 causes it to step to its alternate stable condition so that the next selection will take place on the opposite channel (odd or even) and cause MR2 to operate instead of MR1 so that the belt 68 will, on the next playback cycle be drawn back to the original condition.

K1 is now de-energized since MXS is home; K2 is unlatched; K3 is unenergized because K5 is unenergized since the end-pulse has ceased; the coin has dropped and the system is ready for a new selection.

OPERATION OF TRANSCRIBING UNIT

The transcribing unit 120, which is not fully detailed, may contain a record signal reproduction unit 120′ similar to the playback unit 20 illustrated in FIGS. 1 to 4 except that its output would not only be audible for monitoring purposes during recording therein, but would be connectable to the recording means of the unit 20 by the illustrated pluggable connector CO1 to magnetically transcribe into the channels of the belt of said playback unit 20. The connection or coupling may also be made by automatic means to be described.

A section of the transcribing unit 120 which will permit automatic transcribing is shown in FIG. 5. Also shown is the auxiliary equipment in the playback unit 20 to facilitate transcribing.

To automatically transcribe locally, the transcribing unit 120 is connected to the playback unit by means of multiple pin connector CO1. SW3 is thrown "up" to the transcribing position shown. It is assumed that the carriage is home and SW1 is down which provides a ground through SW3 to K4 which becomes energized. As K4 becomes energized, the bus to which the push button switches PB are in series with "A" becomes grounded and thereby simulates the start condition (i.e., coin deposited and pushbutton depressed). Also, as K4 is operated, selector switch K7 steps to the first position and thereby simulates a selection of the first channel by grounding the first segment of 176. As the sequence of operation of the playback unit begins, the carriage moves off "home" releasing SW1. This removes the original ground which operated K4. However, K4 is slow to release so that it remains energized until SW1 has transferred and now supplies a ground for K4 through the contact of K2, pin 3 of CO1 and contacts of K4 now remains energized for the duration of one transcription.

When K4 is actuated, another set of contacts causes the transcriber motor MT to start, driving a recording medium such as a single channel magnetic tape containing a series of the desired record signals spaced apart thereon such that sufficient time intervals are allowed for carriage travel and tape runout from the end of each recording to the end of the tape. At the time of said tape 68 runout, when K2 is energized, K4 becomes de-energized thereby opening the circuit to MT and causing it to stop. Automatically when the carriage in unit 20 returns to home, the cycle is repeated until all signals reproduced from 120′ are recorded. When the carriage returns home after recording the last signal, a ground is again provided to energize K4 which again steps K7. However, the next step on K7 shown as line 122, causes K4 to de-energize thereby discontinuing all action and bringing the cycle to a stop. When SW3 is returned to its normal position for playback, K7 is released returning to home.

Although not shown, in another form of the transcribing unit, closures similar to those of the pushbutton switches PB and "A" of the illustrated playback unit 20 may be incorporated into the transcribing unit 120. They may be operated by means of additional contacts on K4 and another bank of contacts on the minor switch K7 to select the recording to be played back therefrom for transducing onto selected channels of unit 20.

Remote transcribing

Transcribing need not be performed locally at the illustrated reproduction apparatus. By the provision of modified transcribing apparatus including a receiving and relay unit 220 at said reproduction apparatus as shown in FIG. 6 with reference to FIG. 5, and by replacing the switch SW3 with a relay operated switch KSW3, transcribing may be performed from a remote location or master broadcast station to one or a multiple of the record playing units by short wave, over telephone lines, VHF, etc.

For remote transcription control, a momentary tone is sent out from a master station and received at one or more locations each containing a recording device of the type illustrated or the like. This tone causes coil KT1*a* of a tone responsive relay in a control receiver 222 in 220 to become energized which causes its contacts to become latched either mechanically or electrically in the position whereby the relay KSW3 is energized (i.e., units 220 and 20 at the remote station are conditioned for transcribing). A second momentary control tone is then sent out by a signal generator 232 at the control or master station 230 and is received by control receiver 222 which causes another set of contacts in tone responsive relay KT1*b* to close which energizes relay K8 long enough to energize K4 so that it may start the mechanism and latch-in as before. The reason for the addition of relay K8 in the remote transcribing unit control section 220 is described as follows: Without relay K8, the end of a transcription would cause SW4 and K2 to be activated, the carriage to travel home and K4 to release. Immediately upon the carriage 162 returning home, the cycle would be reinitiated due to the activation of SW1 and K4. If remote transcribing is to be performed simultaneously at various locations, the time at which SW1 is activated, and therefore the time at which a new transcription would start, would not necessarily be the same due to variations in the characteristics of the drives, motors, etc. Since this may be a cumulative difference, the circuit between SW1 and K4 is kept open by means of K8 after which a pulse is sent out by the master station to restart transcribing. The record signal to be transcribed onto the channel of the tape, against which the recording head is riding and which is travelling in the forward or transcribing direction, is then transmitted and received by the program receiver 224 in unit 220. The program receiver in this case, feeds the recording head in circuit with the output of 224.

The master station 230 includes a signal transmitter 235 such as a conventional radio transmitter if short wave is employed or the proper amplifier if transmission is by telephone line and a signal generator 232 which may be similar to the tape recorder 120' save that it is manually started by a manual switch 233 and stopped either manually or by automatic means at the end of the transcribing cycle. Recorded on the recording medium or tape of 232 are said individual record signals plus the mentioned control tones for sequentially energizing KT1*a* and KT1*b* which are properly time spaced relative to the record signals recorded therein to account for carriage travel and the different signal recording and tape runout times of the recording unit or units 20. The program receiver 224 and control receiver(s) 222 may be kept in operating condition at all times or may be provided with a switch 226 to be manually operated by a person at the recording unit 220 at a known time in advance of the transmission of said signals from the master station 230. If telephone lines are utilized for signal transmission from the master station to the local station unit 220 the switch 226 may be replaced by a relay switch which is responsive to the ring signal of the telephone line whereby a coupling or connection is made between the transmitter 235 of the master station 230 and said receivers 222 and 224 after the initiation of said phone line ring signal by the operator, by dialing or other automatic means. Transcription may be effected at nighttime when the load on the phone lines is at a minimum or AM and FM radio channels are at minimum usage, and noise is at a minimum.

The transcribing of new record signals by the methods of FIGS. 5 and 6 may also be effected at hi-speed instead of the normal "playback" speed, using the same tape drive motors provided for playback by switching from the normal speed control wires to the high speed control wires. In this particular method of "fast" transcribing a modified switch SW3 would be used to effect this transfer i.e., SW3 instead of being the illustrated double pole double throw (2 Form C) switch would have 2 Form C plus 2 Form A contacts. The 2 Form A contacts would be used to short the normally open contacts of K5 thereby locking the connections for the tape drive motors MR1 and MR2 in the hi-speed conditions.

FIG. 7 is a block diagram showing control and switching means for automatic communication between recording machines including means for automatically transcribing record signals as described, over public or private telephone lines. Block notation form is resorted to for providing a simplified diagram. The system of FIG. 7 is particularly applicable to record signal recording as provided in FIGS. 5 and 6.

The numeral 100 refers to a master signal transmitting and control station comprising a record playback or reproducer unit 101 having a recording medium such as a closed loop tape 102 on a conventional tape transport driven by a constant speed motor MT1 and having a reproduction transducer and pickup head 103 for reproducing signals recorded on said member 102. The numeral 110 refers to a clock operated switch or timer adapted to complete a circuit between the drive means MT1 for the transport of 101 and a power supply at any preset time. In the application of this system for rejuvenating or changing music record signals in juke boxes or the like located remote from the master station 100, the timer 110 would preferably be preset to start said transcribing action during the early morning hours such as between three and six a.m. when the juke box is not generally used and the load on telephone circuits is at a minimum. The timer switch 110 is preferably of the type which will maintain not only said power circuit to the drive means MT1 for the tape transport 101 for the period necessary to complete a transcription cycle of the desired number of record signals but, although not illustrated, also completes circuits between power means and the necessary amplifying and switching means associated with 101 and the devices illustrated. After starting the tape 102 in motion, the signals recorded thereon and reproduced by pickup head 103 are used to effect all control thereafter by completing a communication link between the output of the transducer 103 and transcribing means at one or more remotely situated stations each containing a recording mechanism as described or the like. The output of pickup head 103 is passed to a multioutput transformer 103', after being amplified, said head having multiple outputs 104*a*, 104*b*, 104*c*, etc., each extending to a different switching unit, one of which 105*a* is illustrated as connected to the circuit 104*a*. The switching units 105 link the respective outputs of 103' with respective telephone circuits. The circuit 106*a* connects the input 104*a* to 105*a* with a conventional dial-pulse operated telephone switching system designated by the notation 107. The numerals 107*a*, 107*b*, 107*c*, etc., refer to lines in the telephone system extending to respective substations 100*a*, 100*b*, 100*c*, etc., through the switching system 107. A recording unit and the necessary transcribing apparatus as described is situated at each of the substations or remote locations.

The first signals reproduced from the tape 102 by head 103 include one or more tone signals each of a different characteristic and each reproduced just prior to a respective pulse train for connecting a respective one of the outputs of 103' with a respective circuit from 107. For example, the first signal reproduced from 102 may be a tone signal to which only a first relay T10 in the switching unit 105*a* is responsive. The relay T10 is adapted when so energized to actuate a bistable switch SW10 to close and complete a circuit between the input line 104*a* and a telephone line 106*a* connected to the switching system 107. Since T10 is the only relay in the system of telephone line connection switches 105 which is responsive to said first tone signal, only the line 104*a* will have been connected to an output circuit 106*a*. Thus, the pulse train next reproduced and provided at the output of 103' transformer will pass over the single circuit 106*a* to the switching system 107. The pulse train may be similar to the train of pulses generated when a telephone number is dialed and completes a circuit through the switching system 107 with the input line 107*a* to the selected substation 100*a* over which a ring signal is generated.

The ring signal is passed to a relay TR which is energized thereby and closes a bistable switch SW11 to complete a circuit between the phone line 107*a* and a line 108 extending to a second switch SW12 and to two tone operated relays T2 and T3. The numerals 114 and 115 refer respectively to the switching units containing the bistable relay operated switches SW11 and SW12. Like the unit 105*a* and the other switching units of the phone line connecting switches of the group designated by the general notation 105, said control units 114 and 115 may be of several designs of electromechanical or purely electronic nature. In a simple form, the ring responsive relay TR may energize a monostable solenoid closing SW11 which may be a conventional bistable snap action mechanical switch. The tone operated relay T4 in the unit 114, when energized by a signal reproduced from 101, actuates a solenoid tripping the switch SW11 to open. In a similar manner, the switch SW12 is first closed by a relay T2 responsive to a tone transmitted from 101 and opened when a relay unit T3 become energized. The switching unit 115 is provided in the event that a circuit should be completed between 107*a* and 108 by a switching error in the system 107 or the dial selection of said circuit by error by manual or other means not associated with the apparatus at the transmitting station 100. After reproduction and transmission of the selection pulse train to the switching system 107 which results in the completion of a circuit between the line 104*a* and line 108 of unit 100*a*, a second tone signal may be reproduced from tape 102 by 103 for actuating another relay in one of the output circuits 104*b*, 104*c*, etc., of 103' which completes a circuit with said second output circuit by the means of 105*a* and another telephone line of the group 106 and the switching system 101. This second tone would be followed by a second pulse train for connecting said second completed circuit (106*b* for example) with a circuit (107*b*) to a second substation (100*b*). In this manner, any of the multiple reciving substations may be selectively connected to the output of the transcribing reproduction unit 101 (i.e., by recording and reproducing in tandem order signal groups each comprising a tone or code signal followed by a respective pulse train comprising a digital number equivalent to the number of the circuit being selected).

After all input circuits, equivalent to 108 of station 100*a*, are completed as described, a tone signal is reproduced from tape 102 and transmitted through transformer 103' to each input to which relays in each substation equivalent to relay T2 of switch 115 are responsive thereby completing the circuit in each substation between the recording means of each and the output of the transducer 103 of master station 100. This tone signal is recorded at a position along the constant speed driven tape 102 whereby it will be produced at a time (after the reproduction of the last signals therefrom for completing the last selected circuit) such that the switching system 107 may respond to all signals and effected all circuit connections. The operation of unit 100*a* will be described hereafter and it is assumed that similar control actions occur essentially simultaneously in the other receiving substations selected for transcribing by the signals reproduced from the master station tape 102. The solenoids energized by relays T2 and T3 of switch 115 are also mechanically associated with a second switch 112 which is a double throw, double pole bistable switch actuatable to close when T2 is energized and open when relay T3 is energized. Closing of switch 112 completes a circuit between a power supply and MT2, the motor means driving tape 68 of the recording unit 20*a* past a recording transducer 111 connected to the input line 108 through a line 109 and closed switch SW12. The next signal reproduced from tape 102 is a record signal which is transduced through 111 onto the tape 68. If the recording unit 20*a* is similar to that of FIGS. 1 to 4 and the control system therefore, designated as 113 in FIG. 7 similar to that of FIGS. 5 and 6, then the energizing of switch 112 merely provides a signal to energie KSW3 (ref. FIG. 5). Reference is made to FIGS. 5 and 6 for the automatic control actions occurring thereafter for effecting the movement of the transducing means and the recording means in the unit 20*a*. After the last record signal has been reproduced from tape 102, a tone signal is reproduced and transmitted to all receiving stations. In the unit 100*a*, this tone signal energizes relay T3 which opens the circuit between 108 and 109 and opens the switch 112. (i.e., switches SW12 and 112 may be combined in a multipole, double-throw switch). Another tone reproduced thereafter from tape 102 unlatches all input relays or disconnects the inputs to each selected station. In FIG. 7, the tone energizes relay T4 opening switch SW11. Still another tone transmitted next automatically disconnects the lines 104 from the telephone lines 106. In FIG. 7 the unit 105*a* has the relay T5 energized which opens switch SW10. Shortly thereafter the clock operated switch 110 opens, stopping the motor MT1 and completing the transcribing cycle. A signal reproduced from 102 may also be used to shut down the apparatus.

In an alternate form of control, the mentioned tone operated relays for connecting and opening the various described circuits, may be replaced by coded relays each responsive to a respective pulse code reproduced from 102 in place of the mentioned tone signals.

FIG. 8 illustrates an arrangement of a plurality of magnetic tape cartridges in a record transducing device which is applicable to the hereinabove described apparatus. The device 120 comprises a base or support 121 for retaining a plurality of magnetic tape magazines or cartridges 136 in side-by-side array. A common drive means for the tape T in each cartridge is also supported by the base as is a guide along which a mount 126 for transducing means may travel for positioning one or more transducers in operative relation with a selected magnetic tape.

The base 121 is illustrated as having upstanding side support walls 123 and 124 which support a horizontally disposed floor 122 therebetween. The upper surface of 122 is provided with a toothed track 144 which is engaged by a small spur wheel 145 driven by a motor situated within the housing 128 defining the mount for the transducing means 129. Said mount 128 is movable along a pair of tubular tracks 126 and 127 which are supported by upwardly extending portions 123' and 124' of the side walls 123, 124. A limit switch SW1 is mounted on housing 128 to engage the face of 123' and become actuated to stop the motor driving 128 when said carriage is at "home" position. Control of the motor to position the carriage 128 to align the transducing head or heads thereof with a selected cartridge is effected as described by scanning conductive strips not shown, but insulatedly supported on the surface of 122 or by means of a presettable, bidirectional predetermining counter operatively coupled to wheel 145 or operating of the shaft of the drive motor and adapted to effect motor stoppage by making or breaking circuits with the motor control and a power supply. Power and feedback control lines extend to the carriage 128 through flexible cables 132 and 133, the former which is anchored or plugged into a housing 125 containing said predetermined controls is sufficiently long and flexible to permit travel of 128 from one end of the base 122 to the other.

The cartridges 136 are removably supported in side-by-side array with window openings 137 in their end walls facing the transducer carriage track so that the tapes of each are accessible to the transducer. A plurality of elongated structural members 138, 139 and 140 extend between and are supported by extensions 134 and 135 of the side walls 123 and 124 and are spaced so as to engage the edges or end walls of the cartridge housing which are supported in side-by-side array, as illustrated by fasteners and/or spring means.

A gear motor 141 is supported by wall portion 134 and is coupled to drive a shaft 142 which is supported in gearing by the far side wall portion 135 in front of the array of cartridges. Capstan drive wheels 143 are pinned to shaft 142 at spaced intervals such that each wheel engages a tape of a respective cartrdige which tape is normally compressed between said wheel and a depressor wheel supported for rotation by the side walls of the cartridge in the manner illustrated in FIG. 10. Thus, when a cartridge is correctly positioned between the support means 138, 139 and 140, its tape will be in engagement with a drive means and may be engaged by a selectively positionable transducing means comprising one or more carriage mounted heads 130, 131 which are automatically positioned and projectable against the tape when aligned therewith by the means hereinabove described.

Notation 146 refers to a gear motor, supported by wall 134. A shaft, not shown, extends through all cartridges for driving the reel or reels of magnetic tape in cooperation with the described capstan drive. If the cartridges each contain a closed loop tape arrangement, as illustrated in my said parent application Ser. No. 515,417, the drive means 146 may be eliminated as the capstan drive will be sufficient to effect movement of the tape in its closed loop path.

FIG. 9 illustrates a record transducing arrangement 150 comprising a plurality of tape containing magazines or cartridges 139 supported in side-by-side array in fixed relation to respective transducers 130, 131 which are supported by the same base 151 supporting the cartridges. The base 151 comprises side wall members 151' and 153 supporting an end wall 152 which supports respective mounts 155 for a plurality of recording and/or reproduction transducers 130, 131. The transducers are illustrated as each operatively engaging or in coupling relationship with the respective tapes exposed through openings in the cartridges as described. Said transducers may also be respectively projectable and retractable by bistable solenoids mounted in each mount 154 so that a transducer will not engage its tape except during selective transcription. The cartridges, mounts and drives, therefore, are arranged and provided as in FIG. 8.

There is shown in FIGS. 10 to 13 details of a tape cartridge assembly applicable to this invention including means for removably positioning a plurality of recording tapes carrying cartridges or housings containing either supply and takeup reels or means for retaining a closed loop of magnetic tape with said cartridges being arranged in a side-by-side, fixed array such that they may be easily located, classified, or replaced electrically and mechanically coupled to and selectively recorded on or reproduced from.

A rack 201 is provided for supporting the cartridges in side-by-side and tiered array. The front wall 213 of each magazine 212 has an opening 213' permitting access of a drive wheel and transducer to the tape mounted in the housing.

The racking is adapted to releasably support the cartridges in fixed array and comprises a plurality of structural members such as box beams, including horizontal members joined to vertical members two of which 202 and 202' are illustrated. The box-like frame of structural members defines means for supporting cartridges 212 not only in side-by-side array but in vertical tiers or layer of said cartridges.

FIG. 10 provides a separate transducing and driving assembly 228 for each cartridge, each of which is easily removed from and secured to the racking in a position to engage and operatively couple to the tape of a cartridge held at the same location by the racking. Each cartridge is shown having a supply reel R–1 and a takeup reel R–2 for a magnetic tape 226, the reels being supported in bearing by the side walls of the cartridge. Also supported in bearing by said side walls are a plurality of idler guide rolls 221 to 224 for guiding the tape and a depressor roll 225 which is aligned with and operative to engage the tape between a capstan drive roll 233 of the assembly 228 when the cartridge is inserted into and retained by the racking in the proper location. Alignment and retention of the cartridge in said proper location whereby it is in operative relation with assembly 228 is effected by means illustrated in FIG. 10 and in either FIGS. 11 or 13. In FIG. 11 a U-shaped clamp 236 having flanges 237 and 238 which are respectively adapted to compressively engage the upper portion of the rear wall 214 of the housing of a cartridge situated below said clamp and the lower portion of the rear wall of the cartridge situated above said clamp when the clamp is fastened gainst either members 206 or 207 by means of a wing screw 208, the threaded shank 209 of which is retained by a nut 210 supported within the box beam. The rear wall 214 has a recess 214' provided therein to receive the flange 237 of clamp 236 for centering and assuring alignment of the cartridge relative to the tightened clamp. The legs 237 of the clamp thus spring load and compressively urge the front wall of the cartridge housing against the front, horizontally disposed box beams 203 and 204 of the racking.

In FIG. 13, the individual cartridge housings 212' are each provided with a plurality of guide strips or pins for aligning the cartridge on the racking relative to the transducing and driving assembly 228. Strip 245 is secured to and preferably centered longitudinally along the upper wall 218 of the housing and strip 246 along the lower wall 217 thereof. These strips are slidably received in slotted holes 205–S and 206–S provided respectfully in the lower wall of the upper beam 206 and lower beam 205 so that the housing may be slidably aligned on the racking at predetermined positions.

The transducer and drive assembly 228 is shown in FIG. 10 as being fastened to a metal angle member 211 which is fastened to the front face of the racking. Fasteners F extend through prepositioned holes in the angle 211 pass through flanges of the lower housing 229 which mounted the record playback transducer 230 and supports a second housing 231 against the upper wall thereof which supports a constant speed gear motor 242. The output shaft of motor 242 is coupled by bevel gears 232 and 232' to the shaft of the capstan drive wheel 233. A cable 234 having a pluggable connector 235 conducts electrical power to the motor and transducer of assembly 228 when connected to a plurality of conductors 245 located in a conduit 246 extending along the face of the rack which conduit may also comprise a structural support for said rack. As an alternative design, either or both of the conduits 204, 205 may contain power and record signal conductors or cables connectable to the various transducing and drive assemblies 228 associated with each cartridge by pluggable coupling means similar to 235.

While the arrangement illustrated in FIGS. 10 to 13 is provided with a separate driving and transducing for the tape of each cartridge, by eliminating said driving and transducing means, the cartridges and mounts therefore may be applied to apparatus such as illustrated in FIG. 8 where a single transducer is movable to a transducing position aligned with a selected cartridge and mechanicaly and electrically coupleable thereto to effect recording and/or reproduction.

Novel features of a typical structural conduit are illustrated in FIG. 14 which comprises either a single box-shaped extrusion or an assembly of channel extrusions 247 and 248 forming a box-like enclosed beam when the 249, 250 thereof are welded together. Bonded to the inside surfaces of 246 and insulated therefrom if 246 is metal, area plurality of flat strips 251 of metal to which respective of the conductors of cables 234 are electrically connectable by pluggable means illustrated in FIG. 15.

FIGS. 16 and 17 illustrate structural details of a magazine or cartridge containing a closed loop tape applicable to the devices of FIGS. 8 and 9. With minor modifications, the magazine 136 of FIG. 16 and 17 may be applied to the racking arrangement illustrated in FIGS. 10–13.

In FIG. 17 a plurality of closed loop tape magazines 136–1, 136–2, 136–3, etc., are illustrated as mounted in side-by-side array and removably supported by a plurality of angles 138, 139, 139' and 140 which are secured to the edge walls of the magazine housings by means of fasteners, although the means illustrated in FIGS. 10–13 may also be employed, to retain said magazines in place. Each magazine is provided with a flat housing 161 having side walls 162 and 163, end walls 164 and 166, a top wall 167 and bottom wall 168. An opening 165 is provided in the front end wall 164 through which the plurality of transducers 130, 131 and 131' extend either by the projection of the mount 129 thereof as in the apparatus of FIG.

8 or when the magazine is secured in position relative to the stationary mount 155 of FIG. 9.

The recording member or magnetic tape T is shown guided in a predetermined path whereby a free length T' thereof is diposed aligned with the opening 165 in wall 164 and is retained against the ends of the transducers by means of a plurality of guide rolls or wheels which are supported in rotation by the side walls of the housing 161. The aforementioned capstan wheel 143 is depressively engaged against the tape T in alignment with a depressor wheel 179 which is supported in bearing by the side walls of housing 161 and the arrangement is utilized to drive the tape upwardly towards the outer periphery of a coil TC of the tape occupying the major portion of the housing. The tape winds around a plurality of idlers including wheel 180 disposed near the upper wall 167 of the housing from which it winds onto the exterior of the coil TC and is removed from the inside of the coil TC from which it is guided by a plurality of free-wheeling idlers 172, 173 and 174 which guide the tape onto a pulley 171 which is driven by the power rotated shaft 169 and feeds tape across a plurality of further idlers 175, 176, 177 and 178 in guiding said tape past the opening 165 at the front wall of the housing. A plurality of pin-like projections 181 extend from the side walls 162 and 163 of the housing and are utilized to retain the coil TC in place in cooperation with the idlers 172–174. Thus, as motors 141 and 146 operate, the tape is fed off the inside of the loop or coil TC and wound onto the exterior thereof in movement past the reproduction and/or recording transducers.

In a further embodiment, the drive wheel or capstan 142 may be the movable base 129 in the configuration of FIG. 8 which base also supports the motor driving 143 so that movement of said base to engage the transducers 130, 131 with the tape of a selected housing may also be operative to engage the drive wheel 143 against the tape and to cooperate with the backing wheel 179 in driving the tape in its closed loop path, thereby eliminating the need for a plurality of drive wheels and the operation of simultaneously driving all the tapes in the side-by-side array of magazines as provided in FIGS. 8 and 9.

What I claim is:

1. A magnetic tape apparatus including at least one magnetic tape magazine containing a tape guide wheel supported in rotation by the walls of said magazine and also containing a closed loop formation of magnetic tape wound in a coil and operative to unwind from the inside of said coil and wind onto the exterior thereof, said magazine including means guiding that portion of said tape which unwinds from said coil in a predetermined path which includes travel against and around a portion of said guide wheel, a base including means for releasably receiving said magazine in a predetermined position thereon, a transducing means, a support for said transducing means movable relative to said base from a retracted position to an advance position whereby said transducing means is operatively coupled for transcribing relative to the unwinding portion of said tape, drive means for said tape including a power driven capstan wheel mounted on said support and movable with said transducing means to engage said tape against said guide wheel and to drive said tape past the transducing means when the transducing means is operatively coupled to the tape.

2. A magnetic tape apparatus including at least one magnetic tape magazine containing a closed loop formation of magnetic tape wound in a coil and operative to unwind from the inside of said coil and wind onto the exterior thereof, said magazine including means guiding that portion of said tape which unwinds from said coil in a predetermined path to the exterior of the coil and for maintaining a portion of said tape substantially fixed relative to the magazine, a base including means for releasably receiving said magazine in a predetermined position thereon, a transducing means, a support for said transducing means movable relative to said base from a retracted position to an advanced position whereby said transducing means is operatively coupled to said fixed portion of said tape for transcribing relative thereto, drive means for said tape including a power driven capstan wheel mounted on said support and movable with said transducing means to engage and drive said tape past the transducing means when the transducing means is operatively coupled to the tape.

3. A magnetic tape apparatus comprising in combination with a base, a magnetic reproduction transducing means, means for movably supporting said transducing means on said base, a magnetic tape magazine containing magnetic tape, an opening in a wall of said magazine, means for guiding said tape through said magazine in a path past said opening, means associated with said base for releasably receiving and predeterminately locating said magazine on said base, a depressor wheel rotatably supported by the walls of said magazine behind a portion of the magnetic tape aligned with said opening, means for advancing said magnetic transducing means into operative relation with respect to that portion of the tape aligned with said opening, means for moving said transducing means lateral to said tape for selectively positioning and coupling said transducing means with respect to said tape, and tape drive means including a capstan wheel rotated by a motor and located so as to engage said tape to compress said tape against said depression wheel in response to the advancement of said transducing means into operative relation with said tape whereby the tape will be drawn past said opening when the capstan wheel is rotated by said motor, whereby said transducing means may be operated to selectively reproduce recordings from the tape when said magazine is predeterminately located on said base.

4. A magnetic tape apparatus including a plurality of magnetic tape magazines, means for supporting said magazines in side-by-side array, each of said magazines containing a tape guide wheel supported in rotation by the walls of the magazine and also containing a closed loop formation of magnetic tape wound in a coil and operative to unwind from the inside of said coil and wind onto the exterior thereof, each magazine including means guiding that portion of the tape which unwinds from the coil in a predetermined path which includes travel against and around a portion of the magazine guide wheel, a transducing means, a support for said transducing means movable from a retracted position relative to a selected magazine to an advance position whereby said transducing means is operatively coupled for transcribing relative to the unwinding portion of the tape of the selected magazine, drive means for said tape including a power driven capstan wheel mounted on said support and movable with said transducing means to engage said tape against said guide wheel and to drive said tape past the transducing means when the transducing means is operatively coupled to the tape.

5. A magnetic tape apparatus comprising in combination with a base, a plurality of magnetic tape magazines aligned together in side-by-side relationship and each containing an endless loop formation of magnetic tape, an opening in a wall of each of said magazines, means for guiding the magnetic tape of each magazine past the opening thereof, a reproduction transducing means movably supported by said base, means for effecting relative movement of said transducing means and said magazines to allow the scanning of different tapes by said transducing means, said transducing means including a scanning transducer, means for moving said transducing means from a retracted position towards a magazine aligned therewith to bring the transducer into operative relationship with the tape of the aligned magazine, means for retracting said transducing means away from the aligned magazine to permit relative lateral movement of the transducing means and said magazines, means for operatively coupling said transducing means with the tape of the selected magazine, and means operative upon coupling said transducing means with a selected tape for driving said tape past said transducing means.

6. A magnetic tape apparatus comprising:
a base member,
a plurality of magnetic tape magazines each carrying magnetic tape with the tape of each magazine being accessible to the exterior of the magazine,
first support means associated with said base member for retaining said magazines in side-by-side relation,
a plurality of transducing means,
second support means for supporting said transducing means in fixed relation to said magazines and supporting at least one transducer in alignment with each magazine,
means for operatively coupling each transducing means to a respective magazine tape for transducing relative thereto, and
a separate drive means for moving each of said tapes and operable so as to permit the movement of each tape past its transducing means independently of the movement of the other tapes.

7. A magnetic tape apparatus comprising:
a plurality of magnetic tape magazine,
each of said magazines containing a magnetic tape and including supply and take-up means for said tape,
guide means associated with each magazine for guiding the tape thereof in a fixed path,
said apparatus including a base,
means for supporting said magazines fixed with respect to said base in side-by-side relationship,
a plurality of transducing means including at least one reproduction transducer associated with each magazine,
said reproduction transducing means mounted in side-by-side relationship and each supported by said base to be operatively coupled for reproducing signals from a tape of a respective magazine, and
means for driving each tape past the transducer coupled thereto.

8. Recording and reproduction apparatus comprising in combination:
a plurality of magazines each containing a magnetic recording tape,
each of said magazines including housing and parallel side walls and an end wall,
means for guiding said magnetic tape in a predetermined path substantially parallel to said end wall,
racking means for supporting said magazines,
means for releasably securing said magazines in side-by-side array on said racking means,
a plurality of transducing means,
supporting means for said transducing means secured to said racking means,
means for fixedly securing said transducing means in operative relation with a tape of a respective magazine,
separate motor operated drive means for each magazine including means for engaging and driving the tape thereof,
means for securing each of said drive means to said racking means,
means adjacent each transducing means operative to cause the drive means to engage the tape when a magazine is secured to said racking means, and
means for operating the motors of selected drive means to move selected tapes past their transducing means for transducing signals with respect to said selected tapes.

9. A magnetic tape apparatus comprising:
a plurality of magnetic tape magazines,
each of said magazines having supply and takeup means serving to carry magnetic tape,
a base,
means for holding said magazines fixed on said base in side-by-side relationship,
a plurality of transducing means supported by said base and mounted in side-by-side relationship,
said transducing means including at least one reproduction transducer associated with each of said magazines,
means for selectively coupling each reproduction transducer to the magnetic tape of its associated magazine for reproducing signals therefrom,
means for simultaneously driving the tape of all magazines past said transducing means, and
means for selectively operating each transducing means to selectively reproduce the recordings from the tape to which the transducing means is coupled.

10. A magnetic tape apparatus in accordance with claim 9, said means for simultaneously driving the tapes of all said magazines past said transducing means comprising a shaft supported by said base, a motor coupled to rotate said shaft, said shaft being operatively coupled to each of said tapes in said magazines and operative for driving same when said motor is operative.

11. A magnetic tape apparatus in accordance with claim 9, said means for holding said magazines in side-by-side relationship comprising a frame including a plurality of elongated frame members extending substantially parallel to each other and defining respective supports for said magazines, and means for removably securing said magazines to said frame members.

12. A magnetic tape apparatus in accordance with claim 11, said reproduction transducers being also supported by said frame.

References Cited

UNITED STATES PATENTS

| | | | |
|---|---|---|---|
| 2,513,423 | 7/1950 | Owens | 179—100.2 |
| 2,328,539 | 9/1943 | Greenleaf et al. | 179—100.2 |
| 2,549,145 | 4/1951 | Vagtorg | 179—100.2 X |
| 2,571,973 | 10/1951 | Walker | 179—100.2 X |
| 2,617,704 | 11/1952 | Mallina | 179—100.2 X |
| 3,106,612 | 10/1963 | Lemelson | 179—100.2 X |
| 2,213,631 | 9/1940 | Heller et al. | 179—100.2 |
| 2,481,398 | 9/1949 | Danisch | 179—100.2 |
| 2,560,234 | 7/1951 | Masterson | 179—100.2 |
| 2,676,022 | 4/1954 | Roberts | 179—100.2 |
| 2,821,576 | 1/1958 | Gaubert | 179—100.2 |
| 3,009,024 | 11/1961 | Eash | 179—100.2 |
| 2,535,497 | 12/1950 | Jones | 179—100.2 |
| 2,668,059 | 2/1954 | Roberts | 179—100.2 |
| 3,126,162 | 3/1964 | MacKenzie | 179—100.2 |

FOREIGN PATENTS

| | | |
|---|---|---|
| 800,638 | 8/1958 | Great Britain. |

BERNARD KONICK, Primary Examiner

J. F. BREIMAYER, Assistant Examiner

U.S. Cl. X.R.

178—6